(12) United States Patent
Schaefer et al.

(10) Patent No.: US 7,120,711 B2
(45) Date of Patent: Oct. 10, 2006

(54) SYSTEM AND METHOD FOR COMMUNICATING OVER INTRA-HIERARCHY AND INTER-HIERARCHY LINKS

(75) Inventors: Joseph Schaefer, Chandler, AZ (US); David B. Minturn, Hillsboro, OR (US); Prashant Sethi, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 252 days.

(21) Appl. No.: 10/325,807

(22) Filed: Dec. 19, 2002

(65) Prior Publication Data

US 2004/0123014 A1 Jun. 24, 2004

(51) Int. Cl.
*G06F 13/00* (2006.01)

(52) U.S. Cl. .................. 710/104; 710/306

(58) Field of Classification Search ............ 710/312, 710/313–317, 306, 311, 104, 305
See application file for complete search history.

(56) References Cited

U.S. PATENT DOCUMENTS

| | | | | |
|---|---|---|---|---|
| 5,802,333 A * | 9/1998 | Melvin | ........................ | 710/316 |
| 5,805,072 A * | 9/1998 | Kakemizu | ................... | 370/408 |
| 6,081,512 A * | 6/2000 | Muller et al. | ................ | 370/256 |
| 6,157,967 A * | 12/2000 | Horst et al. | .................... | 710/19 |
| 6,370,605 B1 * | 4/2002 | Chong, Jr. | .................... | 710/33 |
| 6,397,356 B1 * | 5/2002 | Yonezawa | ..................... | 714/43 |
| 6,529,963 B1 * | 3/2003 | Fredin et al. | ................... | 710/1 |
| 6,690,668 B1 * | 2/2004 | Szczepanek et al. | ........ | 370/392 |
| 2002/0103943 A1 * | 8/2002 | Lo et al. | ........................ | 710/2 |
| 2003/0163727 A1 * | 8/2003 | Hammons et al. | .......... | 713/201 |
| 2003/0210686 A1 * | 11/2003 | Terrell et al. | ................ | 370/389 |

OTHER PUBLICATIONS

Fibre Channel Physical Interfaces, Revision 13, Dec. 9, 2001, pp. 1, 92, 93.*
PCI Express Base Specification, Revision 1.0, Jul. 22, 2002, pp. 1, 2, 17, 27-35.*

* cited by examiner

*Primary Examiner*—Rehana Perveen
*Assistant Examiner*—Trisha Vu
(74) *Attorney, Agent, or Firm*—Schwegman, Lundberg, Woessner & Kluth, P.A.

(57) ABSTRACT

A system having an I/O interconnect topology utilizes internal packetized communications. The system includes a host system element, a plurality of switching elements, and a root complex to bridge communications between the host system and the switching elements. The ports of at least some of the switching elements have a cross-link device associated therewith, which is a logical device defined by configuration space of the switching element. Each cross-link device defines a cross-link communication path between two switching elements of the hierarchy allowing communications between peripherals to bypass the host.

20 Claims, 9 Drawing Sheets

SYSTEM AND METHOD FOR COMMUNICATING OVER INTRA-HIERARCHY AND INTER-HIERARCHY LINKS

TECHNICAL FIELD

The present invention pertains to computing platforms and processing systems, and in particular, to computing platforms and processing systems having an I/O interconnect topology utilizing packetized communication architecture for internal communications.

BACKGROUND

Today's computing platforms and processing systems are moving toward an I/O interconnect topology that provides a single communication path between each peripheral device and the host. These computing platforms and processing systems may use packetized communications for communicating between the switching elements within the tree structure. Examples of such computing platforms and processing systems include what is referred to as, for example, peripheral component interconnect (PCI) systems and PCI Express systems. Peripheral devices are discovered by such platforms and systems through an enumeration process performed by a host system element.

A problem with these platforms and systems is that because of their hierarchical tree structure, only one communication path exists between any peripheral device and the host requiring the host to participate in all communications. This is inefficient especially when peripherals are capable of direct communication therebetween. In addition, system performance can decrease when any particular communication path is overloaded. Furthermore, if any communication path fails, no redundant path is available.

Thus, there is a general need for an improved computing platform and processing system. Thus, there is also a general need for an improved method of communication with peripherals devices. There is also a need for a system and method that provides shorter communication paths between peripheral devices. There is also a need for a system and method that allows peripherals to communicate directly without host intervention. There is also a need for a system and method that allows peripherals to identify other peripherals by a memory mapped I/O address. There is also a need for a system and method that discovers inter-hierarchical and/or intra-hierarchical communication paths between switching elements of host systems.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Figure 1:
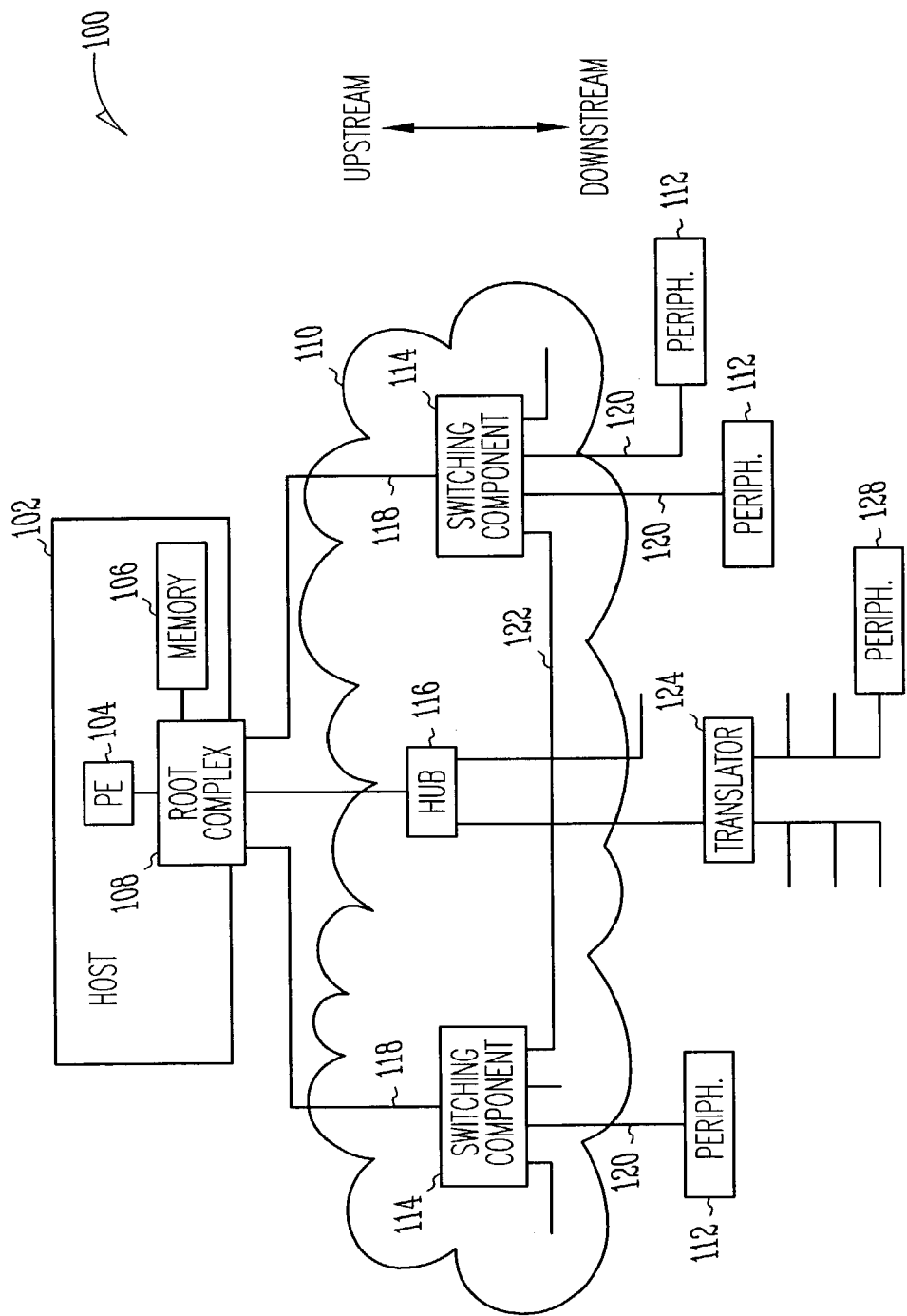
FIG. 1 is a block diagram of a system having an I/O interconnect topology in accordance with an embodiment of the present invention.

In various embodiments, the present invention provides, among other things an improved computing platform, processing system and method. FIG. 1 is a block diagram of a system having an I/O interconnect topology in accordance with an embodiment of the present invention. System 100 may be any computing platform or processing system having an I/O interconnect topology as illustrated, and may utilize packetized communications for internal communications between elements. System 100 may comprise host 102, which may include one or more processing elements (PEs) 104, memory 106 and root complex 108. System 100 may also comprise switching fabric 110 to route packetized communications between root complex and peripheral devices 112. Switching fabric 110 may include one or more switching elements 114 to provide the switching functionality, and may optionally include one or more hubs 116. Switching elements 114 may provide switching functionality in accordance with PCI Express systems.

Communication paths 118 couple root complex 108 with switching elements 114, while communication paths 120 couple switching elements 114 with peripheral devices 112. Communication paths 118 and 120 may provide duplex communications over a physical communication path, and may comprise buses, although this is not a requirement. Although only two switching elements 114 are illustrated, in accordance with embodiments of the present invention, a system may include many hundred switching elements or more. Although switching elements 114 are illustrated as coupled to only one or two peripheral devices 112, in accordance with embodiments of the present invention, switching elements 114 may couple with many peripheral devices. Translator 124 provides for communications with several peripherals 128 through hub 116.

As used herein, the term "downstream" may be used to refer to communications in the direction from host 102 to peripheral devices 112, while the term "upstream" may be used to refer to communications in the direction from peripheral devices 112 to host 102. In accordance with an embodiment of the present invention, fabric 110 may also include one or more cross-link communication paths 122 between switching elements 114. Cross-link communication paths 122 allow for direct communication of packetized data between switching elements 114, which may be viewed as downstream to downstream communications. Although switching elements 114 are illustrated as coupled with one cross-link communication path, in accordance with embodiments of the present invention, any downstream port of a switching element may be configured to couple with a cross-link communication path. Switching elements 114 may have a single upstream port on their upstream side to couple with root complex 108 and a plurality of downstream ports on their downstream side to couple with peripherals 112 and other switching elements 114. Cross-link communication paths 122 may be referred to as intra-hierarchy communication links, and may comprise busses, although this is not a requirement.

Although system 100 is illustrated as having several separate elements, one or more of the elements may be combined and may be implemented by combinations of software-configured elements, such as processors including digital signal processors (DSPs), and/or other hardware elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

In some embodiments, the present invention provides a system with one or more intra-hierarchical communication paths between switching elements of a host system. In other embodiments, the present invention provides a system and method that provides inter-hierarchical and/or intra-hierarchical communication paths between switching elements of host systems. In other embodiments, the present invention provides a method that discovers inter-hierarchical and/or intra-hierarchical communication paths between switching elements of host systems. In accordance with these embodiments, improved communications with peripherals devices may be achieved, shorter communication paths between peripheral devices may also be achieved, and peripherals may communicate directly without host intervention. In one embodiment, data traffic may be better balanced between devices in a system. In some embodiments, the peripherals may identify other peripherals with a memory mapped I/O address space.

Figure 2:
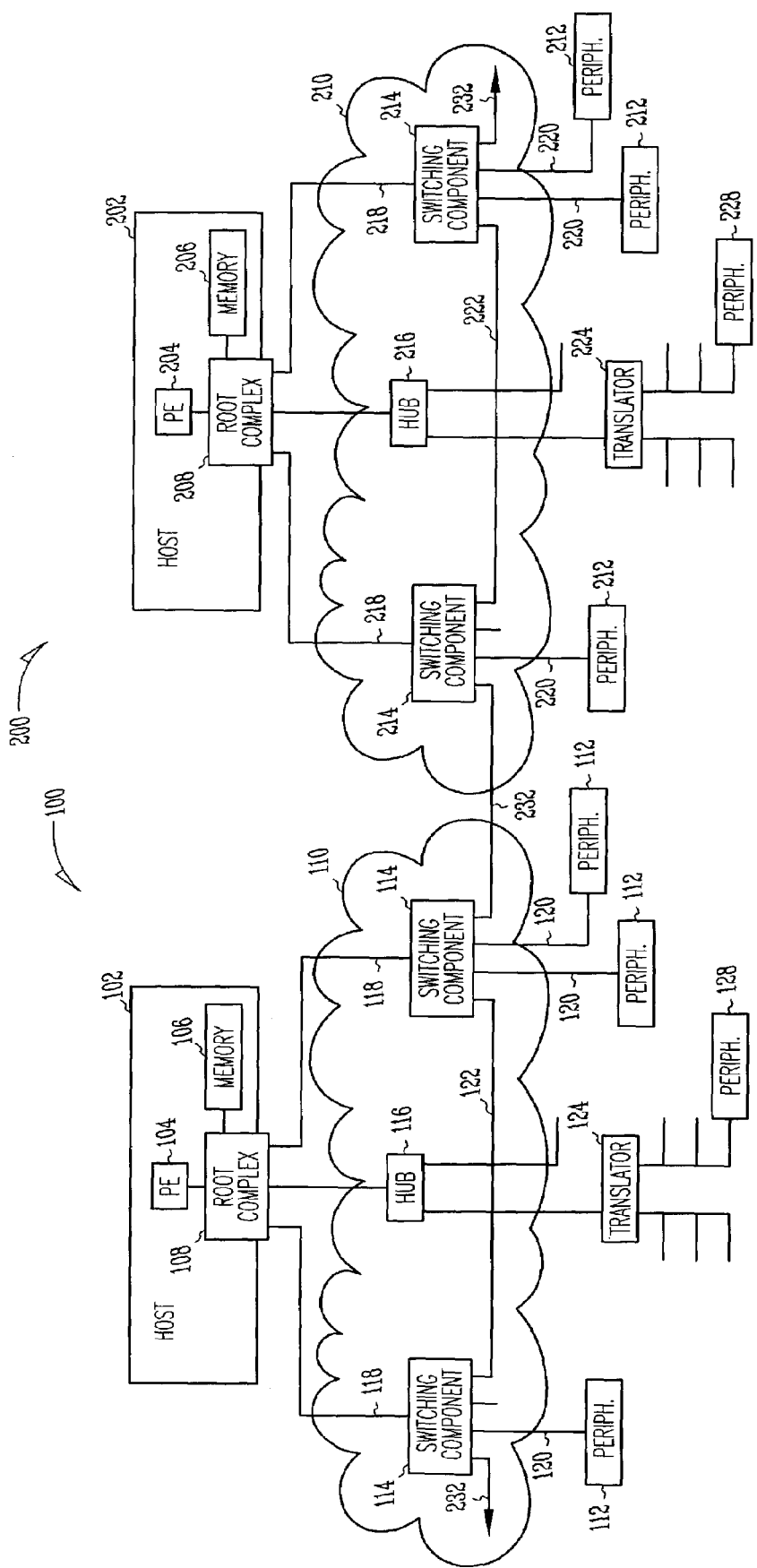
FIG. 2 is a block diagram illustrating systems having an I/O interconnect topology with inter-hierarchy and intra-hierarchy links in accordance with an embodiment of the present invention.

FIG. 2 is a block diagram illustrating systems having an I/O interconnect topology with inter-hierarchy and intra-hierarchy links in accordance with an embodiment of the present invention. FIG. 2 illustrates system 100 of FIG. 1 coupled to system 200 with inter-hierarchy link 232, which is a cross-link communication path between switching elements of the different systems. In one embodiment, the elements (illustrated with 200 series numbers) of system 200 correspond with similar elements of system 100 (FIG. 1), although this is not a requirement. Embodiments of the present invention utilizing inter-hierarchy links 232 are equally applicable to systems of different configurations.

Inter-hierarchy link 232 allows communication directly between one of switching elements 114 of system 100 and one of switching elements 214 of system 200. Among other things, this allows the two or more systems to communicate directly, and provides a more direct communications between peripherals of different systems, possibly without host intervention. Furthermore, host 102 may communicate with host 202 without requiring external connections between peripherals. In addition, inter-hierarchy link 232, in conjunction with intra-hierarchy links 232, may allow host 102 to communicate with any of peripherals 212, while inter-hierarchy link 232, in conjunction with intra-hierarchy links 122 may allow host 202 to communicate with any of peripherals 112. Inter-hierarchy communication link 232 may comprise one or more busses, although this is not a requirement.

Figure 3:
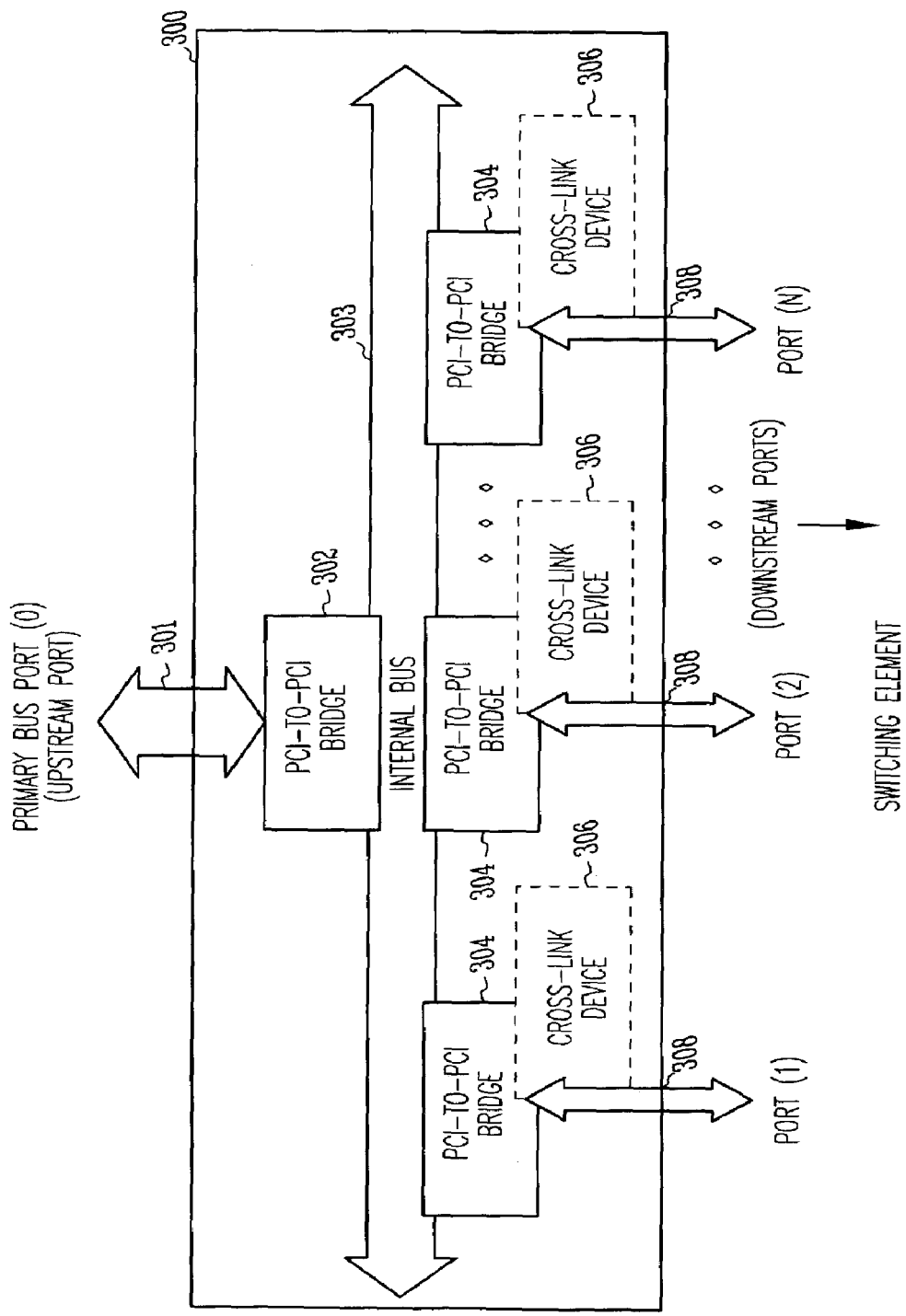
FIG. 3 is a block diagram of a switching element in accordance with an embodiment of the present invention suitable for use in a system having an I/O interconnects topology with inter-hierarchy and/or intra-hierarchy links.

FIG. 3 is a block diagram of a switching element in accordance with an embodiment of the present invention suitable for use in a system having an I/O interconnects topology with inter-hierarchy and/or intra-hierarchy links. Switching element 300 may be suitable for use as one of switching elements 114 (FIG. 1) or one of switching elements 214 (FIG. 2), although other switching element configurations may also be suitable. Switching element 300 may include peripheral component interconnect (PCI)-to-PCI bridge 302 to interface with upstream port 301 and internal bus 303. Switching element 302 may also include PCI-to-PCI bridges 304 for interfacing downstream ports 308 and internal bus 303. Accordingly, packetized communications received at upstream port 301 may be provided at a particular one or more of downstream ports 308, while packetized communications received at one of downstream ports 308 may be provided to upstream port 301. In accordance with at least one embodiment, switching element 300 may be defined to be transparent to current PCI enumeration software operating on a host. Accordingly, the switching elements may be defined as a network of PCI-to-PCI bridges 302 and 304.

In embodiments, PCI-to-PCI bridges 302, as illustrated in switching element 300, may have behavior and programming interfaces in accordance with the PCI and PCI Express specifications. For example, when these bridges encounter a packet, they may make forwarding decisions based on bus, memory and/or I/O ranges, which may be programmed into their respective register sets. These bridges generally do not modify a packet, but decide whether to forward or not forward a packet based on packet's type and addressing information found within the packet.

In accordance with embodiments of the present invention, cross-link devices 306 may configure any downstream port 308 for communications with other switching elements over cross-link communication paths, such as over inter-hierarchy cross-links 232 (FIG. 2) or intra-hierarchy cross-links 122 (FIG. 1). This is described in more detail below. In one embodiment, cross-link devices 306 are logical devices defined by configuration space associated with switching element 300. Cross-link devices 306 may have a number of features that support topologies in a system, such as system 100 (FIG. 1).

In accordance with an embodiment of the present invention, configuration cycles from the host view the cross-link device of the attached switch component. In other words, a cross-link device can only be seen from the downstream (secondary) side of the PCI-to-PCI bridge controlling that port. Configuration cycles from upstream may not detect a local cross-link device (e.g., a configuration cycle targeting a downstream port with no other device attached may "master abort").

Figure 4:
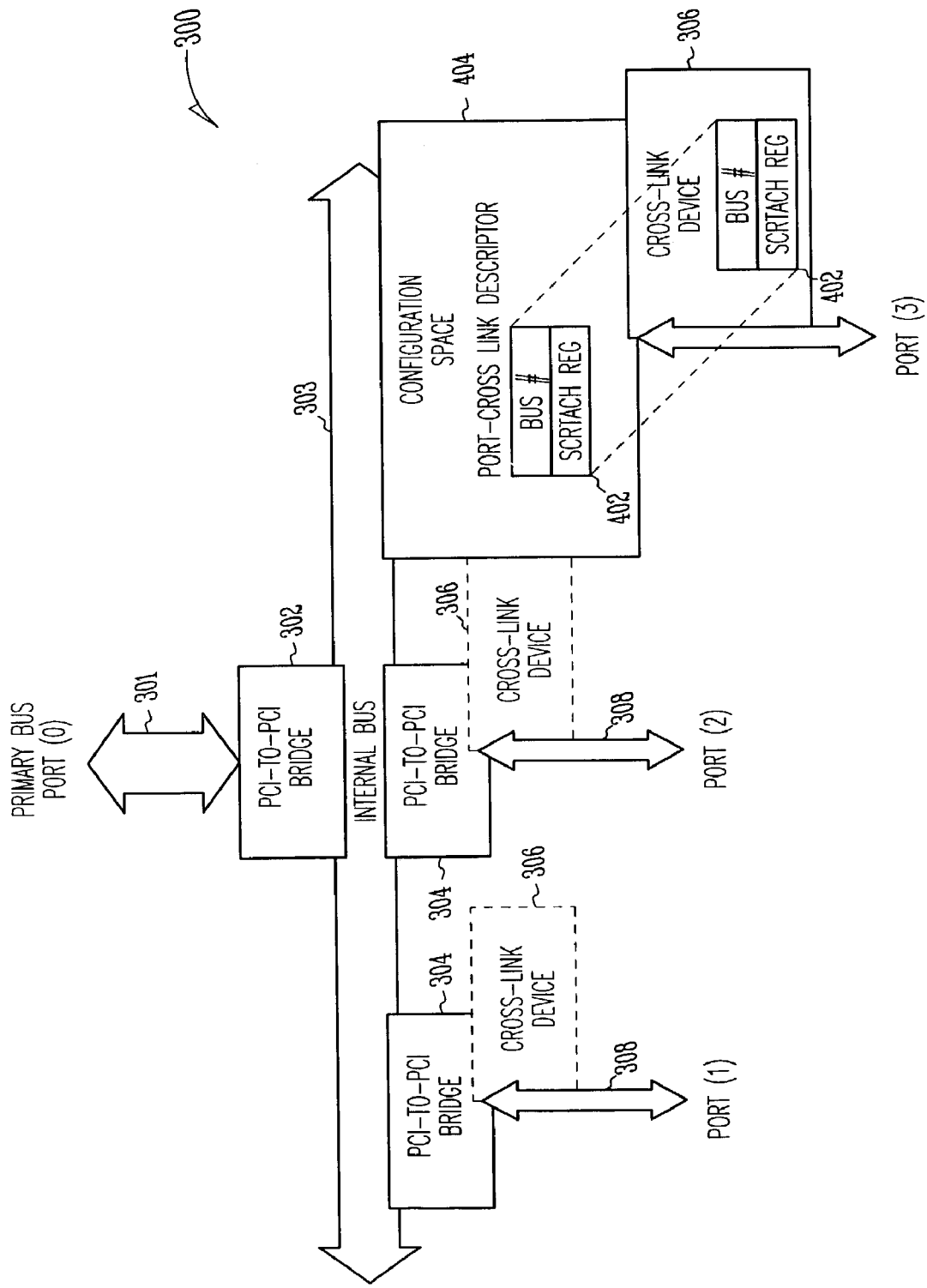
FIG. 4 illustrates shared registers of configuration space utilized by bridge devices and cross-link devices in accordance with an embodiment of the present invention.

In one embodiment, a group of shared registers are provided in the cross-link device's configuration space, as well as in the bridge device. This shared resource is used by configuration software to determine the cross-link type. FIG. 4 illustrates shared registers 402 of configuration space 404 utilized by bridge devices 304 and cross-link devices 306 in accordance with an embodiment of the present invention.

Figure 5:
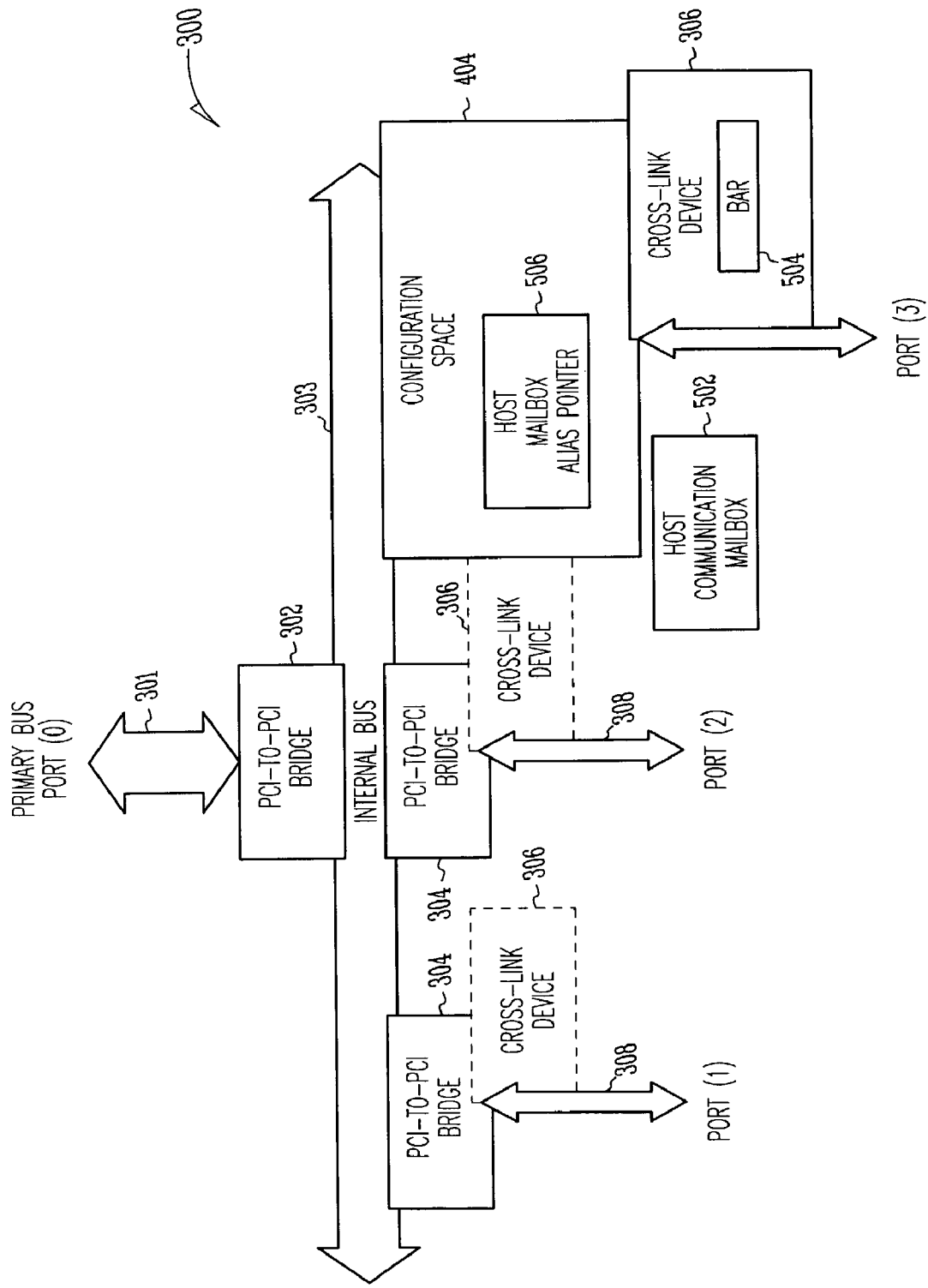
FIG. 5 illustrates the use of mailboxes for communications between cross-link devices and host systems in accordance with an embodiment of the present invention.

FIG. 5 illustrates the use of mailboxes for communications between cross-link devices and host systems in accordance with an embodiment of the present invention. In one embodiment, cross-link devices 306 may have mailbox 502 that may be used by the neighboring host for purposes including communicating with the local host. Mailbox 502 may be provided with sufficient data storage for passing messages and information. The mailbox may have a mechanism for signaling (e.g., interrupt) the local host of a pending message. The address of the mailbox may appear in the local address space, which may be PCI compatible, of both the local host and of its neighbor. The neighboring host may view a cross-link device as an endpoint device. The cross-link device may request an address be assigned for its mailbox (similar to a PCI base address register (BAR) 504 mechanism). The local host may gain access through the associated bridge for that port. The bridge may request sufficient space, using its own BAR 504, for all of its memory-mapped storage including the mailbox of its cross-link device. As part "port descriptor" held within the bridge's configuration space 404, an offset may be programmed that points to the mailbox. Accordingly, address alias 506 may be created to mailbox 502 for the local host.

The benefits of these additional pathways are numerous. For example, they may provide for better system performance by balancing data traffic between devices in the system across several pathways rather than just one. Multiple paths between devices may also offer a higher level of system reliability by providing redundant pathways for transmitting data between devices.

Figure 6:
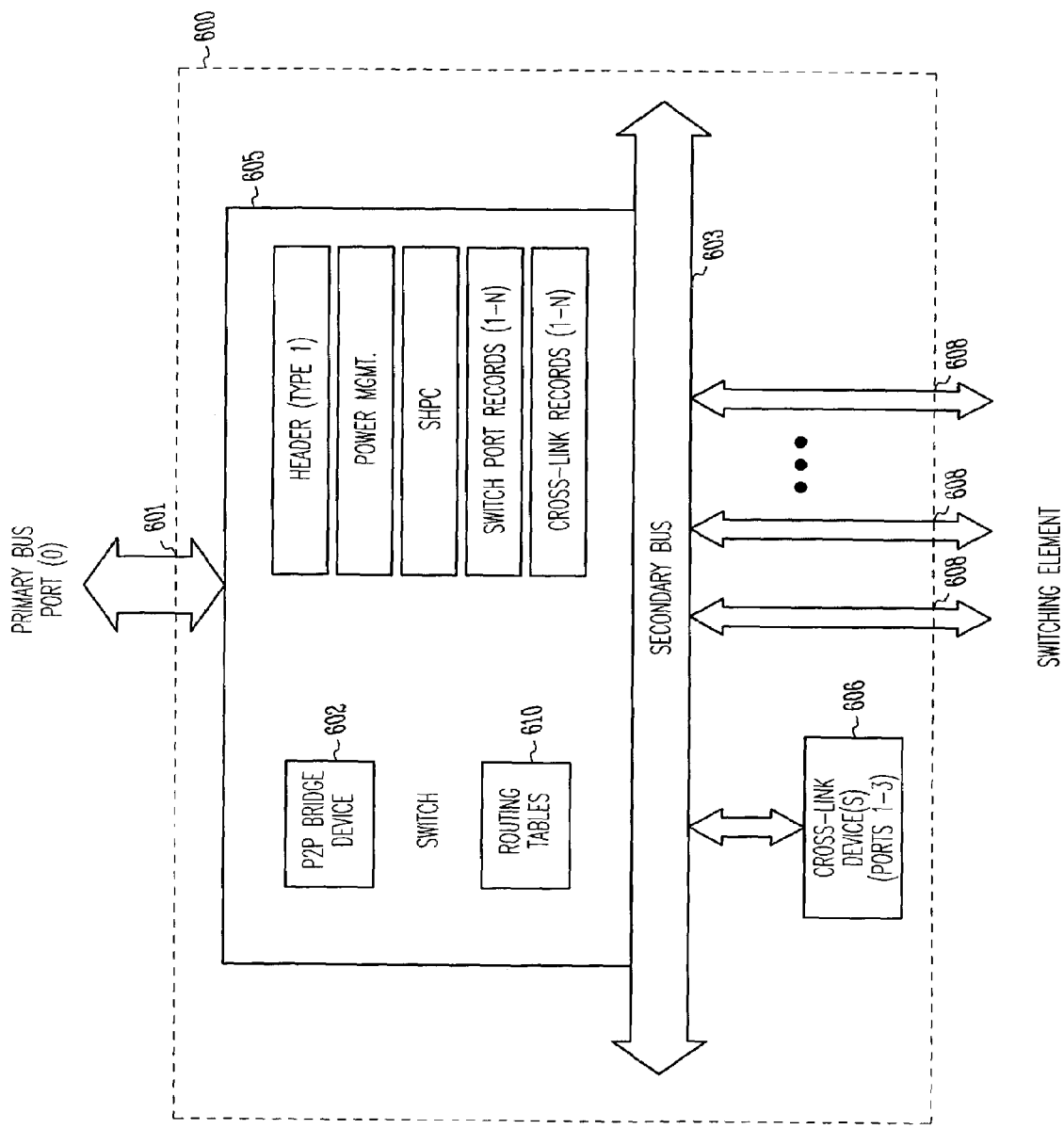
FIG. 6 is a block diagram of a switching element in accordance with an alternate embodiment of the present invention suitable for use in a system having an I/O interconnects topology with inter-hierarchy and/or intra-hierarchy links.

FIG. 6 is a block diagram of a switching element in accordance with an alternate embodiment of the present invention suitable for use in a system having an I/O interconnects topology with inter-hierarchy and/or intra-hierarchy links. Switching element 600 may be suitable for use as one of switching elements 114 (FIG. 1) or one of switching elements 214 (FIG. 2), although other switching element configurations may also be suitable. Switching element 600 includes PCI-to-PCI bridge 602 to couple upstream port 601 with downstream ports 608 through internal bus 603, which may be a PCI-type bus. Sub-switching element 605 may utilize routing tables 610 for routing packets between ports. Cross-link devices 606 may include a cross-link device for each downstream port 608 and may function similarly to cross-link devices 306 (FIG. 1). Cross-link device 606 may be a logical device defined by configuration space.

The illustrated embodiment of switching element 600 includes sub-switching element 605, which may be a single PCI-like bridge device. In one embodiment, the programming interface for element 605 may be patterned after a PCI-compatible configuration register definition. The elements illustrated on the right-hand side of device 605 may represent examples of PCI Express PCI-to-PCI bridge header and PCI Express compatible capability list entries. These elements are a representative list, not an exhaustive list, of capabilities present in device 605. The cross-link records illustrated in device 605 are described in more detail below (see FIG. 7).

Figure 7:
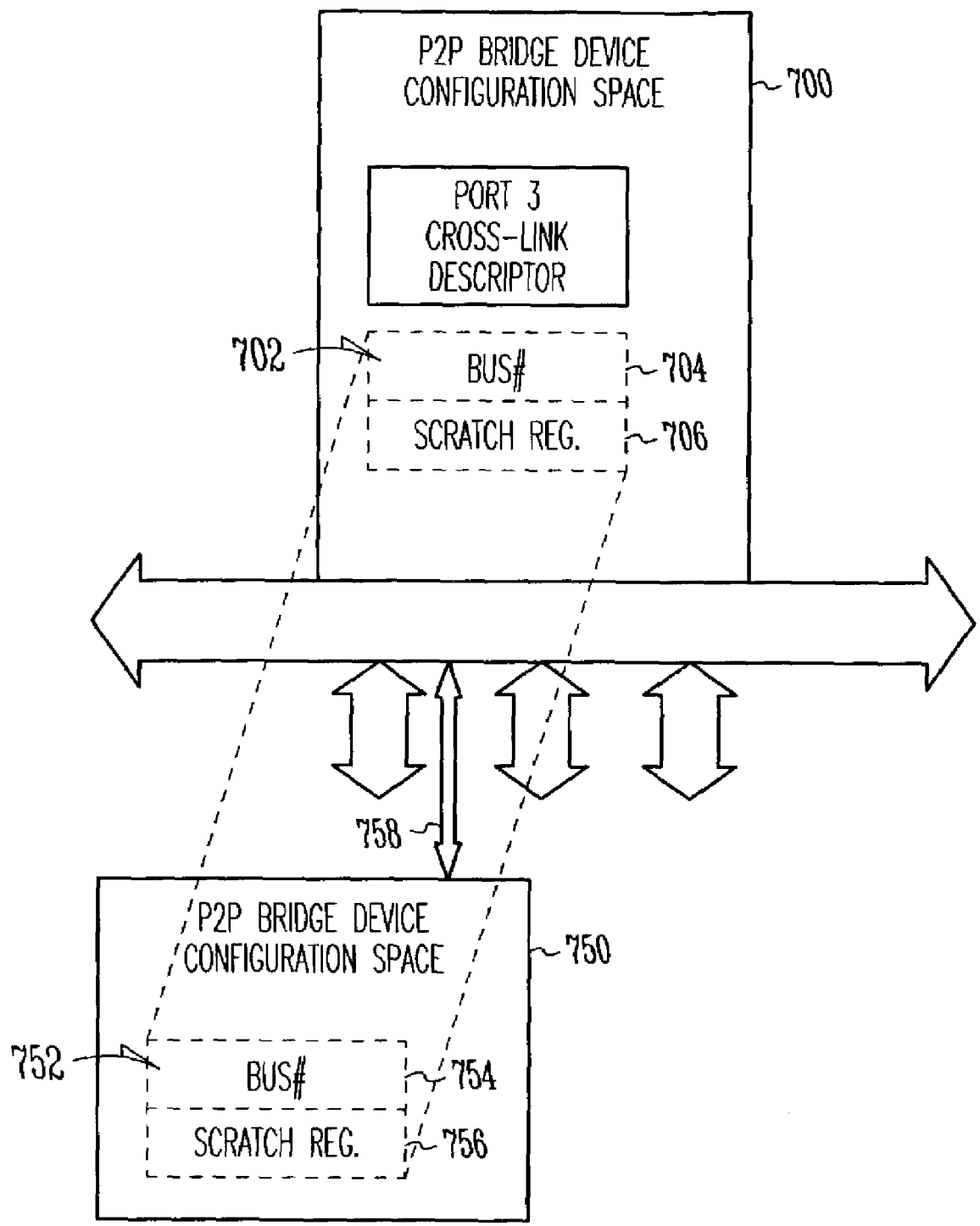
FIG. 7 illustrates a process for identifying cross-link types in accordance with an embodiment of the present invention.

FIG. 7 illustrates a process for identifying cross-link types in accordance with an embodiment of the present invention. The process of identifying the type of cross-link (e.g., as either an intra-hierarchical cross-link or an inter-hierarchical cross-link) may be performed after a PCI compatible enumeration has occurred in the system for each hierarchy. In one embodiment, the host that performed the earlier PCI enumeration may also be responsible for identifying cross-links within the local host domain.

For the host that identifies a cross-link device during enumeration, the host may begin by treating the cross-link device like any other PCI or PCI Express compatible device. This will include the allocation of any memory and I/O address ranges for local device resources. In addition, the enumerating host may write the bus value used to address the cross-link device's configuration space into the shared bus number register for use during the link-type identification process.

Figure 8:
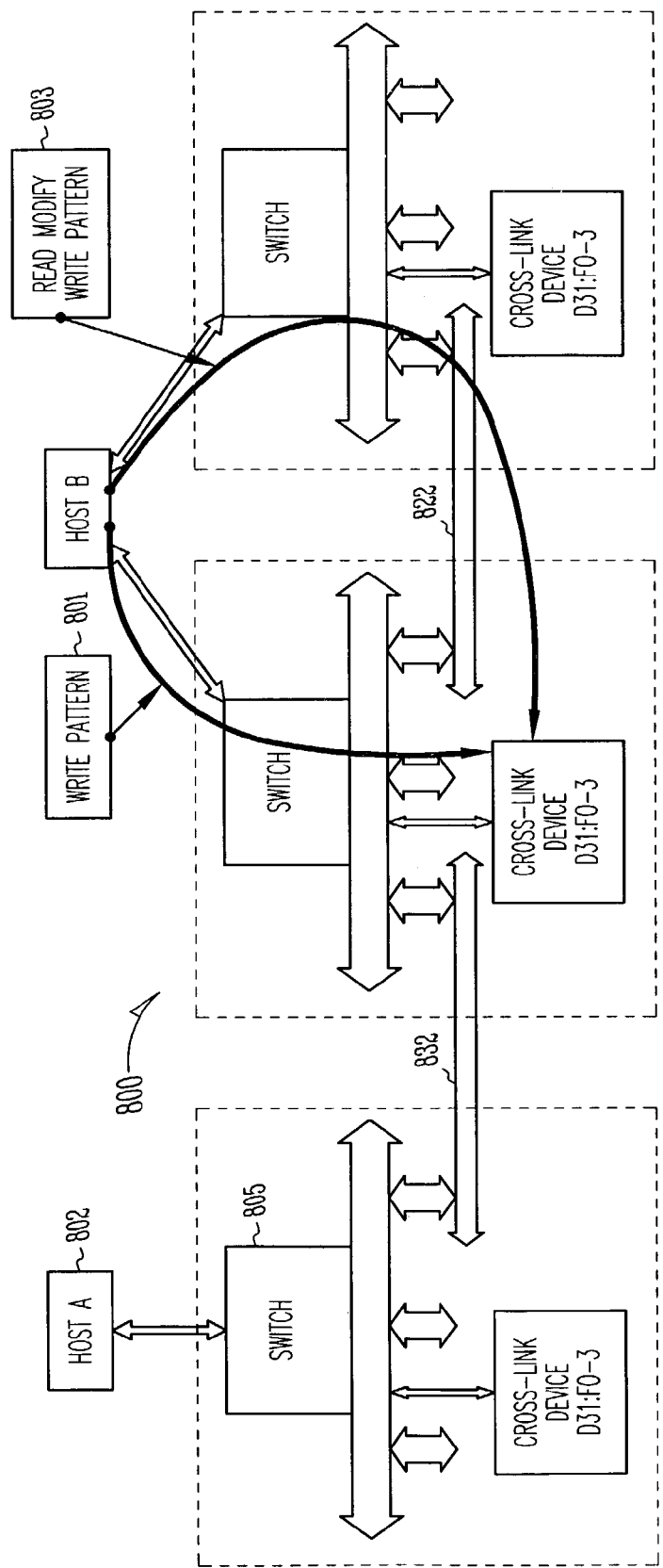
FIG. 8 illustrates additional communication paths between a host and a cross-link device in accordance with an embodiment of the present invention.

Intra-hierarchical cross-links (e.g., within a given host domain) may be identified as follows: Cross-link devices 750 are discovered during the enumeration process and bus number 756 used may be written into cross-link record register 754. After all cross-link devices have been marked, 'alias descriptor' register 702 may be checked within configuration space 700 of the bridge device for ports identified as cross-links. A "range" test of the bus number written into the port descriptor 704 may be performed. If the bus number is outside the range of buses discovered during the PCI compatible enumeration, then the cross-link associated with cross-link device 750 may be an inter-hierarchical communication link, such as communication link 232 (FIG. 2). A unique pattern may be written (write pattern 801 (FIG. 8)) in scratch register 706 of this same 'alias descriptor' register set 702. Using stored bus number 704, a derivation of this unique pattern may be written (e.g., by performing a Read-Modify-Write 803 (FIG. 8)) in scratch register 756 of the cross-link device 750. The altered pattern may be read from the bridge device 704 and tested for a match. When the patterns match, then the identified cross-link may be an intra-hierarchical link, such as link 122 (FIG. 1). When the patterns do not match, then the identified cross-link may be an inter-hierarchical link, such as link 232 (FIG. 2). FIG. 8 illustrates the testing for additional communication paths between a host and a cross-link device to identify whether a cross-link either an inter-hierarchical cross-link, such as link 832 between host systems 800 and 802 or intra-hierarchical cross-link 822 within host system 800.

Figure 9:
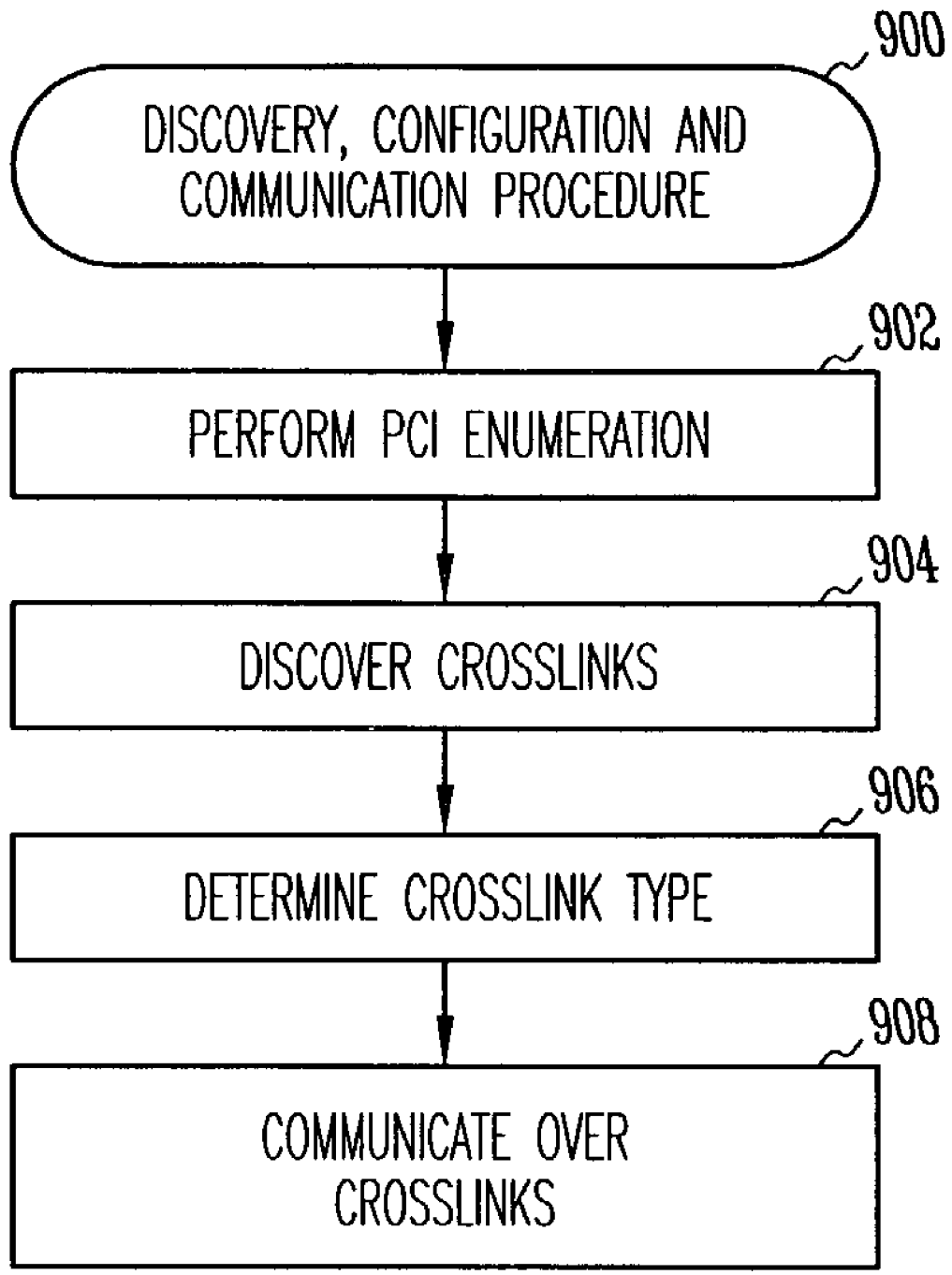
FIG. 9 is a flow chart of an inter-hierarchy and/or intra-hierarchy link discovery, configuration and communication procedure in accordance with an embodiment of the present invention.

FIG. 9 is a flow chart of an inter-hierarchy and/or intra-hierarchy link discovery, configuration and communication procedure in accordance with an embodiment of the present invention. Procedure 900 may be performed by almost any computing platform or processing system having an I/O interconnect topology, and may utilize packetized communications for internal communications between elements. An example of a suitable system for performing procedure 900 is system 100 (FIG. 1). Procedure 900 allows a host system to discover intra-hierarchical and/or inter-hierarchical communication links, configure for communication over the discovered links, and allow communications over the intra-hierarchical and/or inter-hierarchical communication links. Although the individual operations of procedure 900 are illustrated and described as separate operations, one or more of the individual operations may be performed concurrently and nothing requires that the operations be performed in the order illustrated. In operation 902, a PCI-type enumeration may be performed by the host system. During enumeration, peripherals are identified and communication paths to peripherals are discovered. During operation 902, configuration space for the various ports of switching elements may be configured allowing for packetized communications to be routed appropriately. For example, each port may be associated with memory locations and ranges, and may include routing tables, which may be used to direct packets identified with particular memory locations to particular ports of a switching element.

In operation 904, cross-links are discovered. In one embodiment, cross-links may be discovered during operation 902. As part of operation 904, the configuration space of the bridge devices and cross-link devices is configured. In addition, the configuration space of a cross-link device may be updated with memory addressing locations and configuration information of the further downstream switching element.

In operation 906, the host may determine whether a cross-link is an inter-hierarchical cross-link or an intra-hierarchical cross-link. Operation 906 may include the host system element modifying a write pattern to configuration space of one of the cross-link devices and comparing the modified write pattern with a corresponding pattern within configuration space associated with another cross-link device. When the configuration space is shared, the modified write patterns may match indicating an intra-hierarchical cross-link.

In operation 908, packetized communications are routed over the cross-links. As part of operation 908, memory locations are extracted from a packet received at a switching element, at least a data portion of the packet is routed to a cross-link device over a bus internal to the switching element based on the memory location, the cross-link device receiving the packet may route the packet over the cross-link to another switching element based on the configuration information associated with the cross link device.

Cross-link devices may provide host-to-host communications through the use of the mailbox found within the cross-link device. However, generalized packet traffic traveling over the downstream-downstream links, such as links 832 and 822 (FIG. 8) is accomplished by programming the devices controlling these ports with the appropriate routing information. This routing information can take the form of memory or I/O address ranges programmed into the switch element's registers or can be programmed into a routing table stored within the switching elements. The mailbox allows the hosts to pass configuration information back and forth. This information may then be used to program routing tables or address registers in the devices at either end of link 832 or 822 for forwarding of general packet traffic across the link.

In one embodiment, the present invention provides an article comprising a storage medium having stored thereon instructions, that when executed by a computing platform, result in discovering intra-hierarchical and/or inter-hierarchical communication links, configuring for communication over the discovered links, and/or communicating over the intra-hierarchical and/or inter-hierarchical communication links. In this embodiment, the article may be computer-readable medium (e.g., computer disc, CD, memory) having a computer program stored thereon.

Thus, an improved computing platform and processing system has been described. A system with one or more intra-hierarchical communication paths between switching elements of a host system has also been described. A system and method that provides inter-hierarchical and/or intra-hierarchical communication paths between switching elements of host systems has also been described. Accordingly, improved communications with peripherals devices may be achieved, shorter communication paths between peripheral devices may also be achieved, and peripherals may communicate directly without host intervention. The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A system comprising:

a plurality of switching elements and a plurality of cross-link devices, wherein ports of at least some of the switching elements are associated with the cross-link devices, the cross-link devices defined by configuration space of the switching elements, the cross-link devices providing a cross-link communication path between two of the switching elements; and a root complex to bridge packetized communications between a host system element and the switching elements, wherein the host system element is configured to discover cross-link communication paths provided by the cross-link devices during an enumeration process performed by the host system element to define the configuration space for an associated one of the cross link devices, wherein the host system element is configured to modify a write pattern to configuration space of a first one of the cross-link devices, and wherein the host system element is configured to compare the modified write pattern with a corresponding pattern within configuration space associated with a second cross-link device.

2. The system of claim 1 wherein the switching elements are arranged in a hierarchy to couple the root complex with peripherals, and wherein the cross-link devices are configured to permit packetized communication between peripherals coupled to ports of the switching elements over the cross-link communication path bypassing the host system element, wherein the switching elements include a bridging element to read a memory location from received packets, to identify a port from configuration space, to route at least a data portion of the packet to another bridging element associated with the identified port over a bus internal to the switching element, and to transfer a packet that includes at least the data portion over the cross-link communication path to another of the switching elements.

3. The system of claim 2 wherein the cross-link device is configured to define a communication path between a switching element of another system permitting communications between peripherals bypassing the host of either system,
   wherein when packets are received at one of the switching elements for routing over one of the cross-link communication paths to the another system, the one switching element provides a message in a mailbox of the cross link device, the mailbox allowing the systems to pass configuration information for cross link communications between the systems.

4. The system of claim 2 wherein the root complex includes a host bridge and one or more root pods, and wherein the plurality of switching elements are coupled to the root complex through the root pods, and
   wherein communication paths between the root complex and the switching elements, and the cross-link communication path comprise at least two differentially driven signal paths.

5. The system of claim 2 wherein the host system element includes at least one processing element and memory.

6. The system of claim 5 further comprising a host bridge to couple the at least one processing element to the plurality of switching elements through the one or more root ports.

7. The system of claim 2 wherein the system is one of a computing platform and a processing system.

8. The system of claim 2 wherein the bridging element includes a peripheral component interconnect (PCI)-to-PCI bridge coupled to the bus.

9. The system of claim 1 further comprising cross-link communication paths coupling downstream ports of at least some of the switching elements, each cross-link communication path being defined by one of the cross-link devices associated with a port of one of the switching elements.

10. The system of claim 1 wherein at least one of the switching elements is configured to provide a peripheral component interconnect express (PCI Express) functionality.

11. A method for communication between peripherals comprising:
   discovering intra-hierarchical communication links between a first switching element and a second switch within an I/O interconnect topology of a first host system utilizing internal packetized communications;
   configuring configuration space for communication over the discovered links including configuring a configuration space associated with a first cross-link device of the first switching element and configuring a configuration space associated with a second cross-link device of the second switching element, wherein configuring is performed by a host system element, and wherein configuring the configuration space includes a peripheral component interconnect (PCI) enumeration; and
   communicating over the intra-hierarchical communication links.

12. The method of claim 11 further comprising:
   discovering inter-hierarchical communication links between the first host system and a second host system, the second host system having an I/O interconnect topology; and
   communicating over the inter-hierarchical communication links between the first and second host systems.

13. The method of claim 12 further comprising determining whether a discovered communication link is either an intra-hierarchical communication link or an inter-hierarchical communication link by modifying a write pattern to configuration space of the first cross-link device and comparing a corresponding write pattern within configuration space of the second cross-link device.

14. The method of claim 11 wherein the method is performed by a system that includes the host system element, a plurality of switching elements including the first and second switching elements, a root complex to bridge communications between the host system element and the switching elements, wherein the cross-link device being a logical device defined by configuration space of the switching element, each cross-link device defining a cross-link communication path between two switching elements.

15. An article comprising a storage medium having stored thereon instructions, that when executed by a computing platform, result in:
   discovering intra-hierarchical communication links between a first switching element and a second switching element within an I/O interconnect topology of a first host system utilizing internal packetized communications;
   configuring configuration space for communication over the discovered links including configuring a configuration space associated with a first cross-link device of the first switching element and configuring a configuration space associated with a second cross-link device of the second switching element, wherein configuring is performed by a host system element, and wherein configuring the configuration space includes a peripheral component interconnect (PCI) enumeration; and
   communicating over the intra-hierarchical communication links.

16. The article of claim 15 wherein the instructions, when further executed by the digital computing platform, result in discovering inter-hierarchical communication links between host systems having an 1/0 interconnect topology.

17. The article of claim 16 wherein the instructions, when further executed by the digital computing platform, result in communicating over the inter-hierarchical communication links between the host systems.

18. A communication device comprising:
   a plurality of down-stream ports to provide a top of an I/O interconnect topology, wherein at least one of the downstream ports is configured to interface with a peripheral component interconnect (PCI)-to-PCI bridge; and
   a processing element to implement intra-hierarchical communications between the ports, wherein a first port of the ports is associated with a first cross-link device, wherein a second port of the ports is associated with a second cross-link device, and wherein the processing element is to discover the intra-hierarchical communication links within the topology, and is to configure configuration space of each of the first and second cross-link devices for communication over the discovered links for communications over the intra-hierarchical communication links.

19. The device of claim 18 wherein the topology is configured to utilize internal packetized communications.

20. The device of claim 19 wherein the processing element is further configured to discover inter-hierarchical communication links to another hierarchy, to determine whether a discovered communication link is either an intra-hierarchical communication link or an inter-hierarchical communication link by modifying a write pattern to configuration space of a first cross-link device, and to compare a write pattern within configuration space of a second cross-link device.

* * * * *

UNITED STATES PATENT AND TRADEMARK OFFICE
CERTIFICATE OF CORRECTION

PATENT NO.        : 7,120,711 B2                                            Page 1 of 1
APPLICATION NO. : 10/325807
DATED             : October 10, 2006
INVENTOR(S)       : Schaefer et al.

It is certified that error appears in the above-identified patent and that said Letters Patent is hereby corrected as shown below:

On the Title page, Item (56), under "Other Publications", in column 2, line 1, delete "Fibre" and insert -- Fiber --, therefor.

In column 9, line 14, in Claim 4, delete "pods," and insert -- ports, --, therefor.

In column 9, line 16, in Claim 4, delete "pods," and insert -- ports, --, therefor.

In column 10, line 33, in Claim 16, delete "1/0" and insert -- I/O --, therefor.

In column 10, line 44, in Claim 18, delete "a processing element" and insert -- a processing element in a host system --, therefor.

Signed and Sealed this

Ninth Day of January, 2007

JON W. DUDAS
*Director of the United States Patent and Trademark Office*